May 19, 1925. 1,538,677
M. BIRKIGT
VEHICLE BRAKE OPERATING DEVICE
Filed Jan. 10, 1921 2 Sheets-Sheet 1

Inventor
Marc Birkigt
By
Attorney

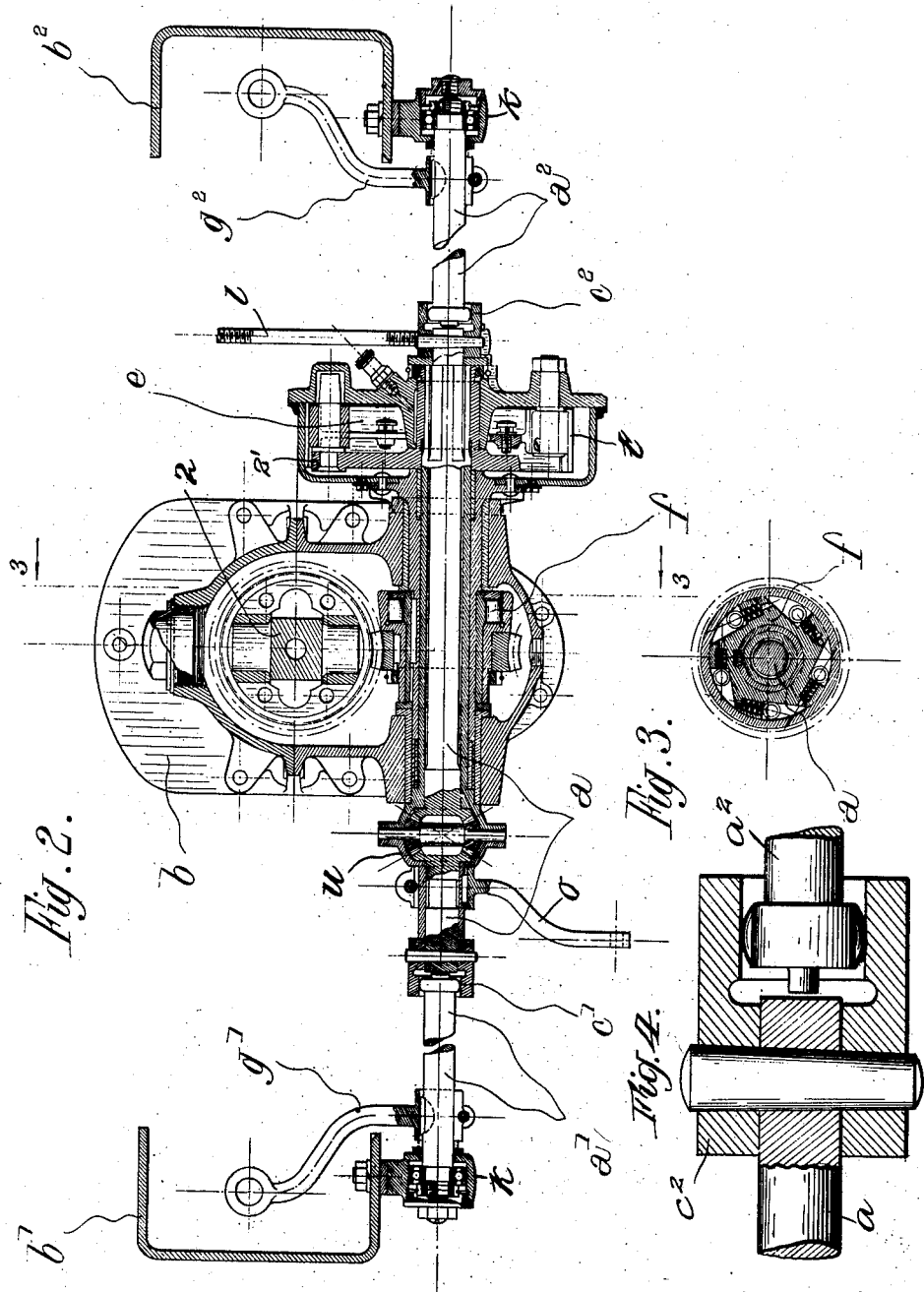

Patented May 19, 1925.

1,538,677

UNITED STATES PATENT OFFICE.

MARC BIRKIGT, OF BOIS COLOMBES, FRANCE.

VEHICLE-BRAKE-OPERATING DEVICE.

Application filed January 10, 1921. Serial No. 436,276.

*To all whom it may concern:*

Be it known that I, MARC BIRKIGT, citizen of the Republic of Switzerland, residing at Bois Colombes, Department of Seine, France, have invented certain new and useful Improvements in Vehicle-Brake-Operating Devices, of which the following is a specification.

This invention relates to improvements in brake operating devices for vehicles, and more particularly to the operation of brakes applied to the front or steering wheels of motor vehicles.

The main object of the invention is to provide a highly efficient brake-operating mechanism which will be quite inexpensive to manufacture and which will be extremely durable in use.

Other objects will appear as the description proceeds.

In the accompanying drawings which form a part of my application,

Figure 2 is a sectional view taken along the line 2—2 of Figure 1.

Figure 3 is a detail sectional view taken along the line 3—3 of Figure 2, showing the one-way clutch mechanism, and Figure 4 is a sectional view on line 2—2 of Figure 1, showing the construction of one of the universal joint connections between the section of the operating shaft.

Like characters of reference are used throughout the following specification and the accompanying drawings to designate corresponding parts.

Figure 1:
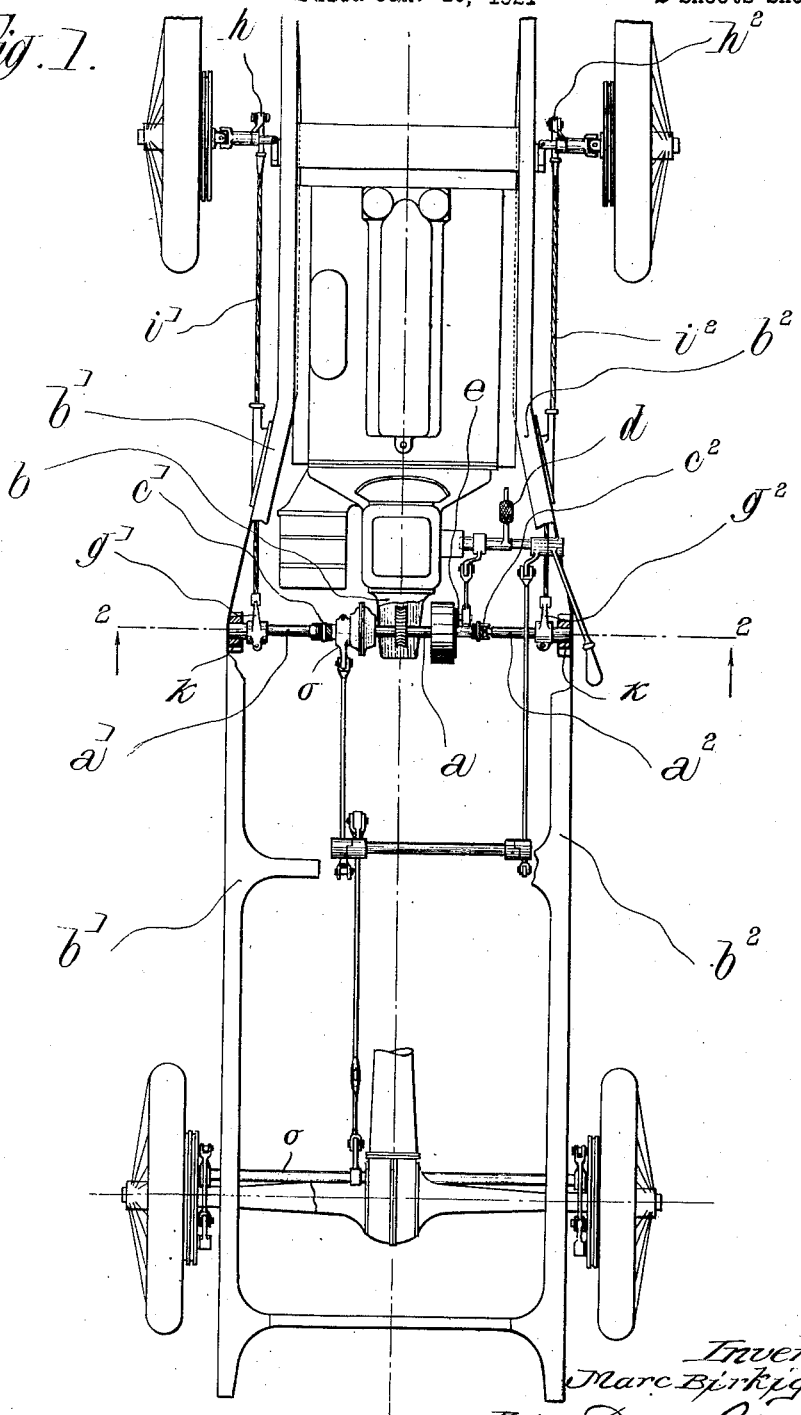
Figure 1 is a diagrammatic plan view of a motor vehicle chassis, showing the brake operating mechanism in operative position thereon.

I have indicated the two side frame members of the chassis at $b^1$ and $b^2$, the same being connected by a plurality of cross brace members, for purposes of reenforcement.

The brake operating shaft is composed of three sections, a central section $a$ and two outer sections $a^1$ and $a^2$. The three-piece operating shaft is mounted transversely of the chassis in such a manner that the central section $a$ of the shaft is supported at the rear end of the transmission housing $b$ of the motor, while the two outer sections of the shaft $a^1$ and $a^2$ have their outer ends journalled in bearings $k$ in the chassis frame and are connected at their inner ends with the opposite ends of the section $a$ through the universal joints $c^1$ and $c^2$.

Arms or levers $g^1$ and $g^2$ are mounted adjacent the outer ends of the two outer sections $a^1$ and $a^2$ of the operating shaft and are connected to operating levers $h^1$ and $h^2$ adjacent the brakes of the front wheels, through the medium of the cables $i^1$ and $i^2$.

It will be seen in Figure 2 of the drawing that the propeller shaft 2 of the motor drives through a continuously moving gear which is keyed to the outer member 2' of the clutch, and constantly rotates while the motor is in operation. The outer member 2' of the clutch co-acts with the shoes $t$ pivotally secured to the shaft $a$ which is connected with the shaft sections $a^1$ and $a^2$. The differential or equalizer $u$ is also positioned between the shaft section $a$ and the section $a^1$ so as to equalize the effect of the apparatus in operating the brakes. A brake pedal $d$ is connected through a rod $l$, which in turn is connected with the clutch $e$, so that when the pedal is depressed, the clutch is actuated to connect the constantly rotating parts 2 and 2' to the shaft section $a$ thereby rotating the same. This rotation of the shaft section $a$ operates through the levers $g^1$ and $g^2$ and through the cables $i^1$ and $i^2$, and also through the levers $h^1$ and $h^2$ to operate the brakes on the front wheels of the vehicle. A lever $o$ is connected to the shaft sections in such a manner that when the brakes on the front wheels are applied, the brake mechanism $o^0$ would be operated through the medium of the shaft $s$.

It will be apparent that inasmuch as the central shaft section $a$ is mounted at the rear of the transmission housing and the outer extremities of the outer sections $a^1$ and $a^2$ of the shaft are journalled in the bearings $k$ in the side members $b^1$ and $b^2$ of the chassis, that ordinary road shocks or possible flexing of the chassis will not effect the operating shaft or the operation of the brake actuating mechanism.

From the foregoing description it will be apparent that to apply the brakes it is only necessary to depress the brake pedal $d$ thereby engaging the moving portion of the clutch with the stationary parts thereof, so that the interconnected shaft sections $a^1$ and $a^2$ will be rotated thereby applying the brakes. It will, of course, be obvious that the shaft sections can only be rotated sufficiently to apply the brakes, inasmuch as the clutch will slip after the sections have been rotated their maximum amount.

It is of course understood, as has been already implied, that the scope of the invention is in no wise limited to any one of the foregoing methods of application or construction which have been more particularly set forth, but on the contrary it is intended to comprise all alternative forms within the scope of the claims.

I claim:

1. In combination with a vehicle brake, an operating device therefor, comprising a shaft divided into sections connected by flexible joints, certain of said sections being pivoted to the framework of the vehicle, means connecting said sections to the braking device and means for angularly displacing one of said sections relative to the others.

2. In combination with a braking mechanism for the wheels of a vehicle, means for operating said brakes, comprising a shaft divided into central and end sections, said end sections being connected to the central section by universal joints and pivoted at their opposite ends to the side frame, means operatively connecting said end sections to the brake mechanism, and means for displacing the central section relative to said end sections.

In testimony whereof I have hereunto set my hand.

MARC BIRKIGT.